United States Patent
Lackey et al.

(10) Patent No.: US 6,764,542 B1
(45) Date of Patent: Jul. 20, 2004

(54) BIODIESEL CUTBACK ASPHALT AND ASPHALT EMULSION

(75) Inventors: Kenneth R. Lackey, Gallatin, TN (US); James R. Alcorn, II, Hebron, KY (US)

(73) Assignee: Marathon Ashland Petroleum LLC, Findlay, OH (US)

(*) Notice: Subject to any disclaimer, the term of this patent is extended or adjusted under 35 U.S.C. 154(b) by 0 days.

(21) Appl. No.: 10/447,659

(22) Filed: May 29, 2003

Related U.S. Application Data

(60) Provisional application No. 60/385,278, filed on May 31, 2002.

(51) Int. Cl.$^7$ ............................................. C09D 195/00
(52) U.S. Cl. ........................ 106/277; 106/279; 106/280
(58) Field of Search ................................ 106/277, 279, 106/280

(56) References Cited

U.S. PATENT DOCUMENTS

| | | | |
|---|---|---|---|
| 2,877,129 A | * | 3/1959 | Hardman ................... 106/279 |
| 6,001,162 A | | 12/1999 | Hayner et al. |
| 6,015,440 A | | 1/2000 | Noureddini |
| 6,174,501 B1 | | 1/2001 | Noureddini |
| 6,203,585 B1 | | 3/2001 | Majerczak |
| 6,214,103 B1 | * | 4/2001 | Kitagawa ............... 106/284.01 |
| 6,235,104 B1 | | 5/2001 | Chattopadhyay et al. |
| 6,348,074 B2 | | 2/2002 | Wenzel |
| 6,414,056 B1 | | 7/2002 | Puzic et al. |
| 6,414,066 B1 | | 7/2002 | Lem et al. |
| 6,416,249 B1 | | 7/2002 | Crupi |
| 6,417,421 B1 | | 7/2002 | Yao |
| 2002/0026884 A1 | | 3/2002 | Raad |

OTHER PUBLICATIONS http://www.epa.gov/ttn/chief/ap42/ch04/final/c4s05.pdf, located on p. 1, line 15.
http://www.soygold.com/many_uses.htm, located on p. 3, line 15.
http://www.apexnorth.com/applications/, located on p. 3, line 21.
http://www.ott.doe.gov/biofuels.pdfs/biodiesel_from_algae_ps.pdf, located on p. 9, line 21.
http://www.aema.org/, located on p. 12, line 15.

* cited by examiner

Primary Examiner—David Brunsman
(74) Attorney, Agent, or Firm—Emch, Schaffer, Schaub & Porcello Co., L.P.A.

(57) ABSTRACT

A cutback asphalt and an asphalt emulsion comprising biodiesel is disclosed. Cutback is mixed with a sufficient amount of biodiesel to reduce the viscosity of the asphalt, producing, e.g., a cold patch material which is free of added liquid petroleum. An asphalt emulsion of fine particles of asphalt, water and, preferably, an emulsifier, can be formed which is free of added liquid petroleum.

19 Claims, 1 Drawing Sheet

BIODIESEL     PRIOR ART

BIODIESEL CUTBACK ASPHALT AND ASPHALT EMULSION

CROSS-REFERENCE TO RELATED APPLICATIONS

This application claims the benefit of U.S. Provisional Application Ser. No. 60/385,278 filed May 31, 2002.

BACKGROUND OF THE INVENTION

1. Field of the Invention

The invention relates to "cutback asphalts" and asphalt emulsions made with biodiesel.

2. Description of the Prior Art

A good discussion of asphalt roads, cutback asphalt and asphalt emulsions is contained in http://www.epa.gov/ttn/chief/ap42/ch04/final/c4s05.pdf, which is incorporated herein by reference.

Although a considerable oversimplification, asphalt road products could be broadly grouped in three categories:

Neat-asphalt obtained by distillation for making roads, e.g., asphalt cement.

Cutback asphalts-an asphalt softened with petroleum solvent, e.g., asphalt cement with gasoline or diesel fuel, for patching.

Asphalt emulsions-solid particles of asphalt in water, usually with an emulsifying agent.

Neat asphalt is used to make new roads and is usually applied hot. Cutback asphalts are used for patching and some types of new road construction or resurfacing, though primarily in cooler months. Asphalt emulsions are used in a variety of thickness and applications, ranging from surface sealers to patching material to new road construction, though primarily in warmer climates.

The present invention focuses on cutback asphalt and asphalt emulsions and problems of repairing and restoring road surfaces.

One of the most common problems encountered in maintaining asphalt roads is potholes or chuck holes. These usually start off small, in areas where there has been freeze/thaw damage or poor surface preparation or some assault on the road surface. Once started, they usually grow progressively worse, due to accumulation of water and pounding. Conventionally, cutback asphalt is used for patching, especially in cooler climates and/or winter months. To make the asphalt soft enough to work with, and/or reduce or eliminate the amount of heating needed to make the material workable, a petroleum solvent is dissolved in the asphalt. Such "cold patch" materials are frequently made in advance and stockpiled to provide a source of material for patching.

Another method of making a high softening point asphalt fluid enough to process at ambient, or relatively low, temperature, is to form an emulsion of asphalt in water with an emulsifier. The asphalt retains its high melting point, but is ground finely enough, to particles on the order of 5–10 microns, that a relatively stable emulsion of asphalt in water is formed which behaves as a liquid with a much lower viscosity than the asphalt particles. The emulsion sets or breaks when the water evaporates and/or it reacts with particles of aggregate.

In some instances roads are made with cutback asphalt or asphalt emulsions.

All cutback asphalts contain solvent. The solvent eventually evaporates, quickly or slowly, depending on the nature of the solvent, local weather conditions and the amount of heating. When used to construct a parking lot or road, the amounts of solvent used, and discharged into the air are enormous—from about 2 tons of hydrocarbon per acre of parking lot up to 10–20 tons of hydrocarbon per acre of road.

Modern cars, with catalytic converters burning clean fuels, generate relatively low levels of HC emissions per mile of travel, an order of magnitude less emissions as compared to pre-catalytic converter cars. In contrast, modern road building and repair methods have changed little and the amount of volatile organic compounds released by making or repairing roads using cutback asphalt or asphalt emulsion has not changed significantly. About the only accommodation to the polluting effect of modern roads is legislation in many areas banning use of cutback asphalts, except in winter months.

Another problem with cutback asphalts, especially the quick setting variety, is that the large amounts of petroleum hydrocarbon solvent added, and the volatility of the fractions used, create a fire hazard and subject workers, and those near the road, to exposure to toxic chemicals.

We discovered that it was possible to use a natural oil, derived from vegetable, oils or animal fats, as part of a cutback asphalt or asphalt emulsion. So far as is know, biodiesel has never been used in this way, though use of biodiesel as a release agent has been reported as follows:

http:/www.soygold.com/many uses.htm teaches use of biodiesel as a release agent for Effective Release Agent Tool Cleaning Drag chains in plants Paving equipment clean up. http://www.apexnorth.com/applications/teaches similar uses (e.g., asphalt release agent).

Biodiesel, is now well known and widely available commercially and extensively studied, as shown by 100+papers included in the report, Biodiesel Research Progress, discussed above. Biodiesels are attractive for fuels, and some other uses, because they have a low vapor pressure, are non-toxic and are stable, as per HMIS regulation and do not deteriorate or detonate upon mild heating.

Although these benefits (safety, toxicity) may seem to be an obvious part of biodiesel, it was by no means obvious to look on biodiesel as suitable for either an asphalt cutback solvent or for use in forming an asphalt emulsion. Asphalt has a high molecular weight and is highly aromatic. Biodiesel is aliphatic, contains no sulfur, has no ring structures or aromatics, and is relatively low molecular weight, as compared to asphalt. Biodiesel also contains large amounts of oxygen, approaching 10%. It could be argued that a linear, relatively low molecular weight, aliphatic molecule such as biodiesel would be a good release agent but not suitable as a solvent (in cutback asphalt) nor for forming a stable emulsion (in asphalt emulsions).

SUMMARY OF THE INVENTION

1. General Statement of the Invention

One embodiment of the present invention provides cutback asphalt comprising asphalt obtained from petroleum by distillation and/or extraction and a cutter solvent comprising an ester derived from vegetable oils or animal fats, such as biodiesel.

Despite the discussed above concerns, the aliphatic biodiesel cutback asphalts and asphalt emulsions worked well and had some very unexpected benefits.

The cutback asphalts of the present invention, which have been tested extensively as a patch material, stay in the pothole and have met with the customer approval. For instance, some benefits to using biodiesel include fire hazard safety and low toxicity in preparing the materials also the biodiesel is a very nice material to work with; it has no unpleasant odor, and although it will burn, it has such a low volatility that it will not form an explosive mixture in air under normal processing conditions. The biodiesel is essentially free of aromatics and considered non-toxic for skin contact and is readily biodegradable, should any spills occur. In addition, there were some very unexpected benefits to using biodiesel in cutback asphalts.

The biodiesel cutback asphalt is stable in storage, even when simply left in a pile in a storage yard, which is the usual method of storing such cold patch material. There is no observable run-off, which can occur when liquid petroleum solvents are used as a diluent. There is little or no loss of material due to evaporation, or perhaps drainage, in that a pile of patch material retained a pleasing shiny appearance and was readily worked, after two months in storage while a competitor's product lost its "luster" after about 1 month of storage. Further surprisingly, it is now possible to make a satisfactory cutback asphalt with relatively low amounts of biodiesel, much less than was necessary, or at least customary, for the prior art, liquid petroleum solvent cutback materials.

In another embodiment, the present invention provides an asphalt emulsion comprising emulsifiable particles of asphalt obtained from petroleum by distillation and/or extraction, water and an oil phase comprising an ester derived from vegetable oils or animal fats.

In yet another embodiment, the present invention provides a pavement or paving composition comprising aggregate and from 1.0% to 10.0% of an asphalt composition comprising a cutback asphalt containing biodiesel or an asphalt emulsion comprising biodiesel.

DETAILED DESCRIPTION OF THE PREFERRED EMBODIMENTS

Figure 1:
FIG. 1 is a photograph showing storage stability and weathering of a cutback asphalt patch material made with biodiesel v. a conventional material made with liquid hydrocarbon cutback solvent.

For clarity, a number of terms will be defined for use herein, using terminology consistent with that of many state departments of transportation.
Asphalt
 Dark brown to black cementitious material (solid or liquid) of which the main constituents are bitumens which occur naturally or as a residue of petroleum refining. Liquid aspahits are those asphalts which have been liquefied by blending with petroleum solvents.
Biodiesel
 Biodiesel is generically defined as the mono alkyl ester of a long chain fatty acid derived from renewable lipid sources. Suitable sources include animal fats and vegetable oils. A preferred material is biodiesel made from soy bean oil.
Cutback Asphalt
 Asphalt cement that has been cut back or blended with a diluent of petroleum solvents (prior art) or with biodiesel (invention). The types of cutback asphalts are defined by American Society of Testing and Materials (ASTM) specifications as follows:
  SC=Slow cure type (Road Oils): ASTM D-2026-72
  MC=Medium cure type: ASTM D-2027-76
  RC=Rapid cure type: ASDTM D-2028-76

Dust Palliative
 Any light application of cutback asphalts for the express purpose of controlling loose dust.
Emulsified Asphalt
 An emulsion of asphalt cement and water that contains a small amount of emulsifying agent. An inverted emulsified asphalt shall be considered a cutback asphalt if the liquid asphalt phase was a cutback asphalt.
Penetrating Prime Coat
 Any application of asphalt to an absorptive surface to penetrate and bind the aggregate surface and promote adhesion between it and the new superimposed construction. Prime coats do not include dust palliatives or tack coats.
Tack Coat
 Any application of asphalt applied to an existing surface to provide a bond between new surfacing and existing surfaces and to eliminate slippage planes where the new and existing surfaces meet.

The term "asphalt" (sometimes referred to as "bitumen") refers to all types of asphalts (bitumen), including those that occur in nature and those obtained in petroleum processing. The choice will depend essentially on the particular application intended for the resulting bitumen composition. Preferred materials have an initial viscosity at 140° F. (60° C.) of 200 to 6000 poise. The initial penetration range of the base asphalt at 77° F. (25° C.) is 30 to 350 dmm, preferably 50 to 200 dmm, when the intended use of the composition is road paving. Asphalt, which does not contain any polymer, sulfur, etc. may sometimes be referred to herein as a "base asphalt".

Suitable asphalt components include a variety of organic materials, solid or semi-solid, at room temperature, which gradually liquefy when heated, and in which the predominate constituents are naturally occurring bitumens, e.g., Trinidad Lake, or residues commonly obtained in petroleum, synthetic petroleum, or shale oil refining, or from coal tar or the like. For example, vacuum tower bottoms produced during the refining of conventional or synthetic petroleums oils are a common residue material useful as asphalt composition. Solvent deasphalting or distillation may produce the asphalt.

Solvent deasphalting (SDA) bottoms may be used as part or all of the asphalt of the product blend. SDA bottoms are obtained from suitable feeds such as vacuum tower bottoms, reduced crude (atmospheric), topped crude, and preferably hydrocarbons comprising an initial boiling point of about 450° C. (850° F.) or above. Preferably the solvent deasphalting bottoms are obtained from vacuum tower bottoms, preferably boiling above 538° C. (1000° F.). Solvent deasphalting can be carried out at temperatures of 93–148° C. (200–300° F.). After solvent deasphalting, the resulting SDA bottoms have a boiling point above 510° C. (950° F.), preferably above 540° C. (1000° F.), and a penetration of 0 to 70 dmm @ 25° C. (77° F.), preferably 0 to 50 dmm @ 25° C. (77° F.).
Asphalt Cement
 The asphalt composition may be solely or partly material produced by distillation, without any solvent extracted step. Such material, sometimes referred to as "asphalt cement", have a reduced viscosity of 100 to 5000 poises at 60° C. (140° F.), preferably 250 to 4000 poises, e.g., 500 poises for AC5 (PG52-28) asphalt cement. The asphalt cement component is added in amounts sufficient to provide the resulting asphalt composition with the desired viscosity for the intended application, e.g., 2000 poises at 60° C. (140° F.) for paving applications. For Performance Graded (PG) Applications, the asphalt compositions will have a G*/sin delta value in excess of 1.0 kPa at temperatures ranging from 46 to 82° C., preferably 52 to 76° C. Generally, the asphalt compositions of the present invention may contain from 0 to 100 wt %, preferably from 0 to 90 wt %, e.g., 5 to 95 wt %, of such asphalt cement component. The asphalt cement component of reduced viscosity can be obtained from any suitable source, e.g., atmospheric distillation bottoms.

Fluxing Components

Conventional fluxing components may be added, or present in the purchased asphalt, to improve the flow properties of the asphalt composition and improve the penetration for a desired softening point. Preferably, biodiesel is the primary, or even sole, material added to the asphalt, whether labeled a fluxing component or cutback solvent.

Cutback Solvent is preferably pure biodiesel though other components may be present, either in the as purchased asphalt or added thereto as a fluxing component or to reduce the amount of relatively expensive biodiesel added, or added as part of some other component of the asphalt, e.g., a carrier fluid for polymer or sulfur or some other additive.

The asphalt per se, can be conventional and forms not part of the present invention.

Polymer

Many times, especially for high performance materials, the asphalt will contain a polymer or ground up tire rubber or some other "plastic" like material which can be dispersed or dissolved in the asphalt to swell and form a matrix. Many times the biodiesel cutback asphalt (or the biodiesel asphalt emulsion) will be used without any polymer added. When polymer is added, conventional techniques may be used to blend the base asphalt with the polymer (or copolymer or rubber).

The asphalt cement, polymer, if used, additives such as antistrip, surfactants, or emulsifiers, can be all conventional and form no part of the invention. The processing techniques used to make cutback asphalt and/or asphalt emulsion are likewise well known and widely used.

Biodiesel

The biodiesel is an essential ingredient, but one which is well known and readily available commercially, so only a limited discussion thereof is believed necessary.

As reported by the Canadian Renewable Fuels Association, on their WWW site, biodiesel is referred to as the mono alkyl esters of long chain fatty acids derived from renewable lipid sources. Others have defined biodiesel as a material made from vegetable oils or animal fats.

All biodiesels are based on triglycerides, three fatty acids bound by glycerol. If the source is animal fat, e.g., tallow or lard or whale oil, the fatty acids are saturated, that is they contain no double bonds. If the source is vegetable, the fatty acids are unsaturated, they contain one or more double bonds. Some highly unconventional sources have also been studied, including over 20 years of work on making biodiesel from algae, as reported in Biodiesels from Algae, A Look Back at the U.S. Department of Energy's Aquatic Species Program, which reported that the algae species studied in the program could produce up to 60% of their body weight in the form of triacylgylcerols, the same natural oil made by oilseed crops.

The complete report is incorporated by reference and available on the WWW at http://www.ott.doe.gov/biofuels/pdfs/biodiesel from algae ps.pdf. The preferred route to biodiesel is to break the fatty acids free from the glycerol.

The preferred material for use herein is a mixture of fatty acid esters. Typically these material are made by the transesterification of vegetable oil to biodiesel. One route to biodiesel involves reacting a vegetable oil (a tyriglyceride) with an alcohol, preferably methanol, to form biodiesel and glycerol. The biodiesel produced from vegetable oil may have the formula:

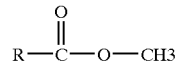

Where R is typically 16–18 carbon atoms and may contain one or more C=C bonds.

More details on biodiesel manufacture may be taken from U.S. Pat. Nos. 6,348,074; 6,015,440; 6,203,585; 6,174,501 and 6,235,104, which are incorporated by reference.

Biodesiel Purity

In certain preferred embodiments, pure biodiesel is used to replace much, and preferably all, of the liquid hydrocarbon oil previously used as a cutback solvent or to form the asphalt emulsion. Pure biodiesel has the optimum properties, in terms of fire hazard, vapor emissions, toxicity and smell. However, in certain embodiments, it is possible to use a mixture of biodiesel and other conventional liquid hydrocarbon streams, e.g., biodiesel + diesel, or biodiesel plus "6 oil", or biodiesel plus aromatic extract, etc. The flammability characteristics can be greatly degraded by addition of even small amounts of, e.g., diesel or naphtha with a high volatility. The low toxicity characteristics may be destroyed by addition of even small amounts of an aromatic stream, BTX.

Dilution may not have a linear degrading effect on the ability of the biodiesel to function effectively as a cutback solvent and/or in the formation of an asphalt emulsion.

Cutback Asphalt Manufacture And Use

Although conventional amounts (of cutback solvent) and conventional manufacturing techniques (for blending cutback asphalt) and conventional application techniques (for putting it on the road) can be used, these may not be optimum.

Conventional amounts of cutback solvent can be added, e.g., the cutback asphalt can comprise from 50 to 96 wt % asphalt, preferably 70 to 90 wt % asphalt, and, most preferably, 75 to 85% asphalt, with the remainder being cutback solvent. In addition, the cutback asphalt may contain conventional amounts of antistrip or other additives.

While any starting asphalt cement can be used, it is preferred to use a high quality material, most preferably one which is PG performance graded, e.g. PG-64-22 (or other comparable quality material, compatible with the same grades of asphalt used to make the roads) where the first number "64" represents the high pavement temperature in degrees Celsius while the second number "22" represents the low paving temperature. This high temperature relates to the effects of rutting and the low temperature relates to cold temperature and fatigue cracking.

In certain embodiments, preferably, the biodiesel, or mixture of liquid hydrocarbons and biodiesel used as a cutback solvent, is used in an amount less than 20 wt % of the solvent+asphalt mixture). In certain other embodiments, it is preferable is use of less than 17.5 wt % solvent, with excellent results obtainable with less than 15 wt % solvent or even 10.0 –12.5 wt % solvent.

A conventional, liquid hydrocarbon based cutback material made with 21% diesel fuel as a cutback solvent did not satisfy the customer and, at elevated temperatures which made it easy to handle, produced so much volatile organic vapor that it presented significant safety issues, due to approaching the explosive limit. The biodiesel based cutback asphalt required much less liquid hydrocarbon, with satisfactory results achieved with 17% or even as low as 12% biodiesel, and at no time were sufficient hydrocarbon vapors generated to create a safety issue.

Indeed, the low volatility of the biodiesel cutback solvent, and examples of minimized use of biodiesel, provided safe use of the cutback asphalt at elevated temperatures. For some applications, a customer might want to heat the cutback asphalt to facilitate the application, promote removal of excess moisture on the roadway, and/or encourage prompt "setting up" of the cutback solvent, both from cooling and some evaporation of biodiesel solvent.

Use of biodiesel based cutback asphalt, especially when applied relatively hot, creates a new class of building materials, with low volatility and low toxicity, approaching that of neat asphalt cement, but which does not require the amount of heating required for a conventional hot mix application. The material will have low VOC emissions associated with slow cure asphalts, but a rapid "set up" time heretofore associated with medium cure or fast cure asphalts.

The biodiesel cutback asphalt may be used in any application where prior art cutback asphalts were used.

Biodiesel Emulsions

Asphalt emulsions were first used, almost a century ago, to reduce dust. Now asphalt emulsion use has expanded, to the extent that asphalt emulsions, can be used for virtually any paving application. When an asphalt emulsion, a physical mixture of asphalt and water, is desired, biodiesel plays an important role, in helping to form and stabilize the emulsion.

Most of the emulsion manufacturing process is conventional, well known, and need not be changed. The starting asphalt, the grinding/emulsification process, the use various surfactants (anionic, cationic or nonionic, as desired) can be conventional. More details of asphalt emulsions, use of hard or soft asphalt, rapid or slow setting, etc. may be found at http://www.aema.org/.

Asphalt emulsions can be made with no liquid hydrocarbon component, but some varieties, especially medium setting (or breaking) emulsions contain a significant liquid hydrocarbon component. In general, use of liquid hydrocarbon oil in asphalt emulsions was (or should have been) minimized, to reduce or eliminate VOC's and reduce the potential for formation of a separate oil phase, which can run off the road and foul the environment.

What is different about biodiesel emulsions is not the asphalt starting material nor the emulsifier, rather it is use of biodiesel as part of the emulsion. In certain embodiments, the best use of biodiesel will be to replace, or at least reduce the amount of, conventional liquid hydrocarbon oils derived from petroleum used in the asphalt emulsion.

While partial or complete replacement of liquid hydrocarbons in asphalt emulsions is an excellent use of the present invention, the biodiesel may also be used in asphalt emulsions not previously containing a liquid petroleum component. Based on other experiments, not directly involving asphalt, we also discovered that biodiesel can lead to the formation of slurries of solids in biodiesel which are far more stable than previous like slurries prepared with liquid petroleum streams. While we do not wish to be bound by the following theory, it is believed that there is some weak bonding or electrostatic attraction between the biodiesel and the particles in the biodiesel.

Because the biodiesel can be present at more than an inert ingredient it is possible to see beneficial effects of biodiesel stabilization of an asphalt emulsion with amounts of excess of 0.5% by weight, though in certain embodiments it will be preferred to operate with 1 wt %, 2 wt %, 4 wt %, and most preferably with amounts ranging from 5 to 15 wt %.

The asphalt emulsion will preferably contain sufficient amounts of conventional emulsifiers, or oils which serve that purpose, such as tall oil, to stabilize the emulsion. The particular emulsifier chosen (cationic, anionic, or nonionic) and the amounts thereof can be conventional and form no part of the present invention.

EXAMPLES

Example 1

Biodiesel Cutback Asphalt

To make cutback asphalt, open appropriate valves add 81.75% PG64-22, 17% biodiesel, 1.25% Arrmaz asphalt antistrip additive. ARRMAZ additive comes from ARRMAZ Products. The preferred asphalts are materials produced by Marathon Ashland Petroleum and available from their Ky. or their La. refineries. Let blend in tank for one hour with mixer on. Although we used the Arrmaz additive, other antistrip additives could be used, e.g., one purchased from Rohm and Haaz Company.

Example 2

Biodiesel Cutback Asphalt—Low Solvent

To reduce the amount of solvent (biodiesel) used even further, Ex. 1 was repeated, but using as the starting asphalt a PG52-28 material and reducing the amount of biodiesel from 17 to 14 wt %. This material can be safely heated to 300° F. without creating an explosive situation.

Example 3

Biodiesel Asphalt Emulsion

Open appropriate valves to feed emulsion mill (Dalworth Machine Products). Recipes are 67.5% PG52-28, 10% biodiesel, 4.0% TALL OIL, 18.5% WATER, Mill runs at 2500 RPMS while product flows through. To make AEP the same procedures except 52.50% PG52-28, 6.0% biodiesel, 1.0% TALL OIL, 40.5% WATER. The water comes from the city of Nashville, the tall oil comes from Georgia Pacific and Arizona Chemical. The PG52-28 comes from Catlettsburg Refinery and Garyville Refinery. When desired, the analysis of cutback and emulsified asphalts may be conducted by the following test methods:

Total distillate (or biodiesel) content of cutback asphalt—ASTM Test Method D402-76.

Petroleum solvent (or biodiesel) content of emulsified asphalt—ASTM Test Method D-244-88.

Discussion

While the cutback asphalt and the asphalt emulsions of the present invention are useful to replace conventional materials with liquid petroleum it is also within the contemplated scope of the present invention that there are many more uses for our "green" asphalt, especially in areas where cutback aspahits or asphalt emulsions were not acceptable because of the presence of liquid petroleum streams. In the case of asphalt emulsions, where an oil-free product was not satisfactory in terms of performance or required by local laws, it is now possispossible to improve the performance of these emulsions by using the present invention which includes some biodiesel in the formulation.

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

We claim:

1. Cutback asphalt comprising asphalt obtained from petroleum by distillation and/or extraction and a cutter solvent comprising an ester derived from vegetable oils or animal fats.

2. The cutback asphalt of claim 1 wherein the solvent comprises biodiesel.

3. The cutback asphalt of claim 1 wherein the solvent comprises an ester of a long chain fatty acid derived from vegetable oil or animal fat.

4. The cutback asphalt of claim 1 wherein the solvent is about 1 to about 50 wt % of the cutback asphalt.

5. The cutback asphalt of claim 1 wherein the solvent is about 5 to about 25 wt % of the cutback asphalt.

6. The cutback asphalt of claim 1 wherein the solvent is about 7.5 to about 20 wt % of the cutback asphalt.

7. The cutback asphalt of claim 1 wherein the solvent is biodiesel derived from soy beans.

8. The cutback asphalt of claim 1 contains PG PG64-22 or PG52-28 as the neat asphalt component.

9. An asphalt emulsion comprising emulsifiable particles of asphalt obtained from petroleum by distillation and/or extraction, water and an oil phase comprising an ester derived from vegetable oils or animal fats.

10. The emulsion of claim 9 wherein the oil phase comprises biodiesel.

11. The emulsion of claim 9 wherein the oil phase, exclusive of any emulsifier which may be present, comprises an ester of a long chain fatty acid derived from vegetable oil or animal fat.

12. The emulsion of claim 9 wherein said oil phase is about 0.5 to about 25 wt % of the emulsion.

13. The emulsion of claim 9 wherein said oil phase is about 4 to about 12 wt % of the emulsion.

14. The emulsion of claim 9 wherein said oil phase is about 5 to 10 wt % of the cutback asphalt.

15. The emulsion of claim 9 wherein said oil phase is biodiesel derived from soy beans.

16. The emulsion of claim 9 wherein PG PG64-22 or PG52-28 is the neat asphalt component.

17. The emulsion of claim 8 comprising an emulsifier.

18. The emulsion of claim 17 wherein the emulsifier is selected from the group of tall oil, anionic, ionic and nonionic emulsifiers.

19. A pavement or paving composition comprising aggregate and from about 1.0% to about 10.0% of an asphalt composition comprising a cutback asphalt containing biodiesel or an asphalt emulsion comprising biodiesel.

* * * * *